US006327075B1

(12) United States Patent
Ishii

(10) Patent No.: US 6,327,075 B1
(45) Date of Patent: Dec. 4, 2001

(54) OPTICAL GAIN EQUALIZATION UNIT, OPTICAL GAIN EQUALIZATION METHOD, AND OPTICAL FIBER TRANSMISSION LINE

(75) Inventor: Satoshi Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/238,094

(22) Filed: Jan. 27, 1999

(30) Foreign Application Priority Data

Jan. 28, 1998 (JP) .................................................. 10-014712

(51) Int. Cl.[7] ........................................................ H01S 3/00
(52) U.S. Cl. ................................... 359/337.1; 359/341.2; 359/161
(58) Field of Search .................................. 359/161, 124, 359/391, 341.2, 337.1

(56) References Cited

U.S. PATENT DOCUMENTS

| 5,436,760 | * | 7/1995 | Nakabayashi et al. | ............... 359/341 |
| 5,923,450 | * | 7/1999 | Dugan et al. | .......................... 359/127 |
| 6,034,812 | * | 3/2000 | Naito . | |

FOREIGN PATENT DOCUMENTS

| 59-92639 | 5/1984 | (JP) . |
| 59-127003 | 7/1984 | (JP) . |
| H08-278523 | 10/1996 | (JP) . |
| 9-244079 | 9/1997 | (JP) . |

OTHER PUBLICATIONS

Zhou et al, "Power Management System Design Modelling of Optical Multi–Wavelength Transport Networks", 1994, IEEE, pp. 1503–1507.*
"Technical Report of Electronic Data Communication", OSC95–35, pp. 13–19, Jul. 1995.
J. Zhou, et al., "Power Measurement System Design Modelling of Optical Multi–Wavelength Networks" Proceedings of the Global Telecommunications Conference (Globecom), US NewY ork, IEEE, 1994, pp. 1503–1507.
E. Shehadeh, et al., "Gain–Equalized, Eight–Wavelength WDM Optical Add–Drop Multiplexer with an 8d–B Dynamic Range" IEEE Photonics Technology Letters, US, IEEE Inc. New York, vol. 7, No. 9, Sep. 1, 1995, p. 1075–1077.

* cited by examiner

Primary Examiner—Mark Hellner
(74) Attorney, Agent, or Firm—Scully, Scott, Murphy & Presser

(57) ABSTRACT

The present invention relates to a gain equalization unit installed on an optical fiber transmission line with a plurality of lines. The gain equalization unit has gain equalizers and loss generators. The gain equalization unit is installed on at least one line, and the loss generators are installed on at least one line. The gain equalization unit equalizes the powers of channels in a predetermined range of the optical fiber transmission line. The loss generators are installed to make the loss amounts of the lines equal.

12 Claims, 8 Drawing Sheets

FIG.2
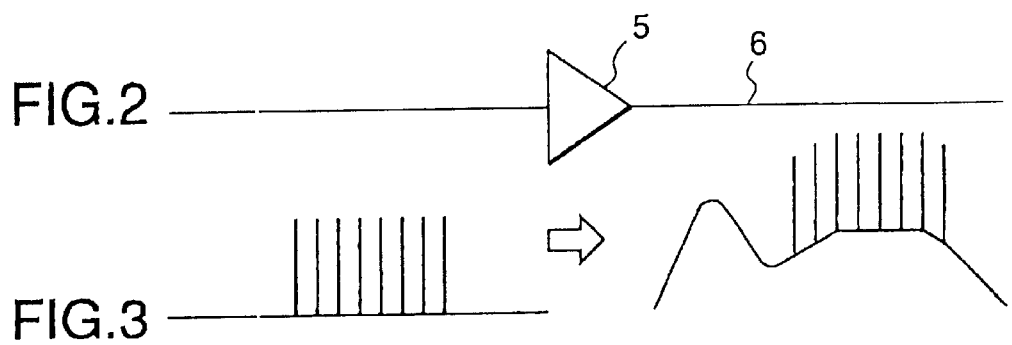
FIG.3
FIG.4
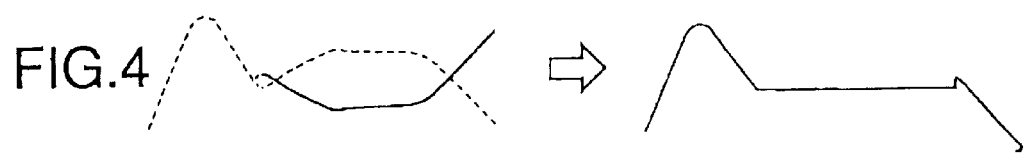
FIG.5
FIG.6
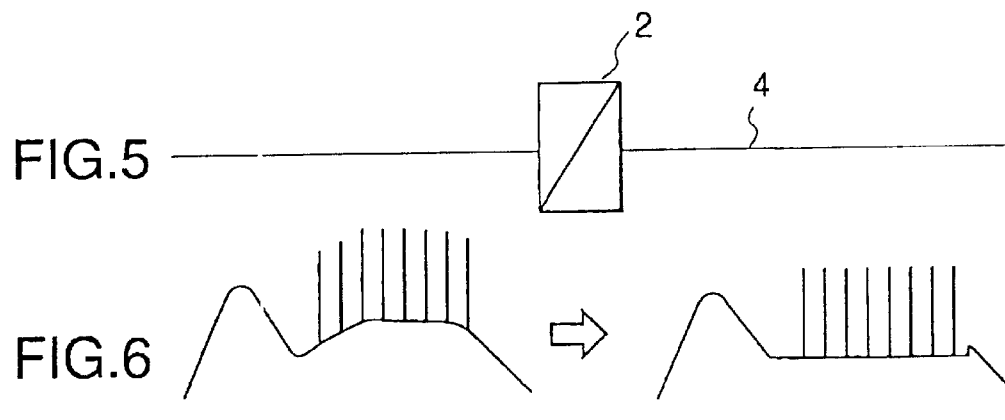

OPTICAL GAIN EQUALIZATION UNIT, OPTICAL GAIN EQUALIZATION METHOD, AND OPTICAL FIBER TRANSMISSION LINE

BACKGROUND OF THE INVENTION

The present invention relates to an optical gain equalization unit, an optical gain equalization method, and an optical fiber transmission line, and more particularly to an optical gain equalization unit, an optical gain equalization method, and an optical fiber transmission line for use in an optical fiber transmission line having multiple lines over which multiplexed signal lights are sent.

A conventional optical wavelength multiplexing system have multiplexed optical signals from a plurality of optical signal sources for transmission through an optical fiber transmission line on which Erbium Doped Fiber Amplifiers (EDFA) are installed. At the receiving end, an optical demultiplexer demultiplexes multiplexed light signals into a plurality of channels and sends each to a light receiver.

Normally, gain equalization units are also installed on the optical fiber transmission line on which erbium doped fiber amplifiers are installed. On such a transmission line, one gain equalization unit equalizes the gains of signals over a range of transmission line where a plurality of erbium doped fiber amplifiers are installed; the gain equalization unit is installed so that the gain equalization of each relay range is optimized. This optimization technology is described in Technical Report of Electronic Data Communication, OSC95-35, pp. 13–19, July 1995.

However, an optical fiber transmission line available today includes at least two communication lines, one up line and one down line. And, erbium doped fiber amplifiers are installed on each transmission line at a predetermined interval. Therefore, it is difficult to install gain equalization units at different points on a transmission line. In addition, because of variations in parts and so forth, the number of gain equalizers required for one line may differ from that required by another. This means that, even when the number of required gain equalization units depends on the line, the loss of a predetermined range of the optical fiber transmission line must be equal among lines.

SUMMARY OF THE INVENTION

It is an object of the present invention to provide a gain equalization unit and a gain equalization method which equalize the gains of the lines at a time and make the level diagram of each line constant. The gain equalization unit according to the present invention is installed at a predetermined interval on an optical fiber transmission line having a plurality of lines, with gain equalizers on at least one line and loss generators on at least one line. The gain equalizers equalize the powers of channels of each line in a redetermined range of the optical fiber transmission line and equalize the gains of channels of each line. The loss generators make the loss of each line constant. The gain equalization method according to the present invention equalizes the gains of at least one line in a predetermined range of the optical fiber transmission line and makes the loss of at least one line constant. The optical fiber transmission line according to the present invention has a plurality of lines and has gain equalizers installed at a predetermined interval on at least one line and loss generators installed on at least one line. The present invention equalizes the gains of the lines at a time and make the level diagram equal.

BRIEF DESCRIPTION OF THE DRAWINGS

The above and other objects, features and advantages of the present invention will become apparent from the following detailed description when taken with the accompanying drawings in which:

FIG. 2 is a diagram showing eight multiplexed optical signals which are sent to an optical amplifier.

FIG. 3 is a diagram showing eight multiplexed optical signals which are output from the optical amplifier.

FIG. 4 is a diagram showing the gain characteristics of optical amplifiers and a gain equalizer.

FIG. 5 is a diagram showing the gain characteristics of the optical amplifiers that have been equalized.

FIG. 6 is a diagram showing multiplexed signals that have been equalized.

FIG. 11B is a diagram showing the level diagram of the light signal in the range shown in FIG. 11A.

DETAILED DESCRIPTION OF THE PREFERRED EMBODIMENTS

Figure 1:
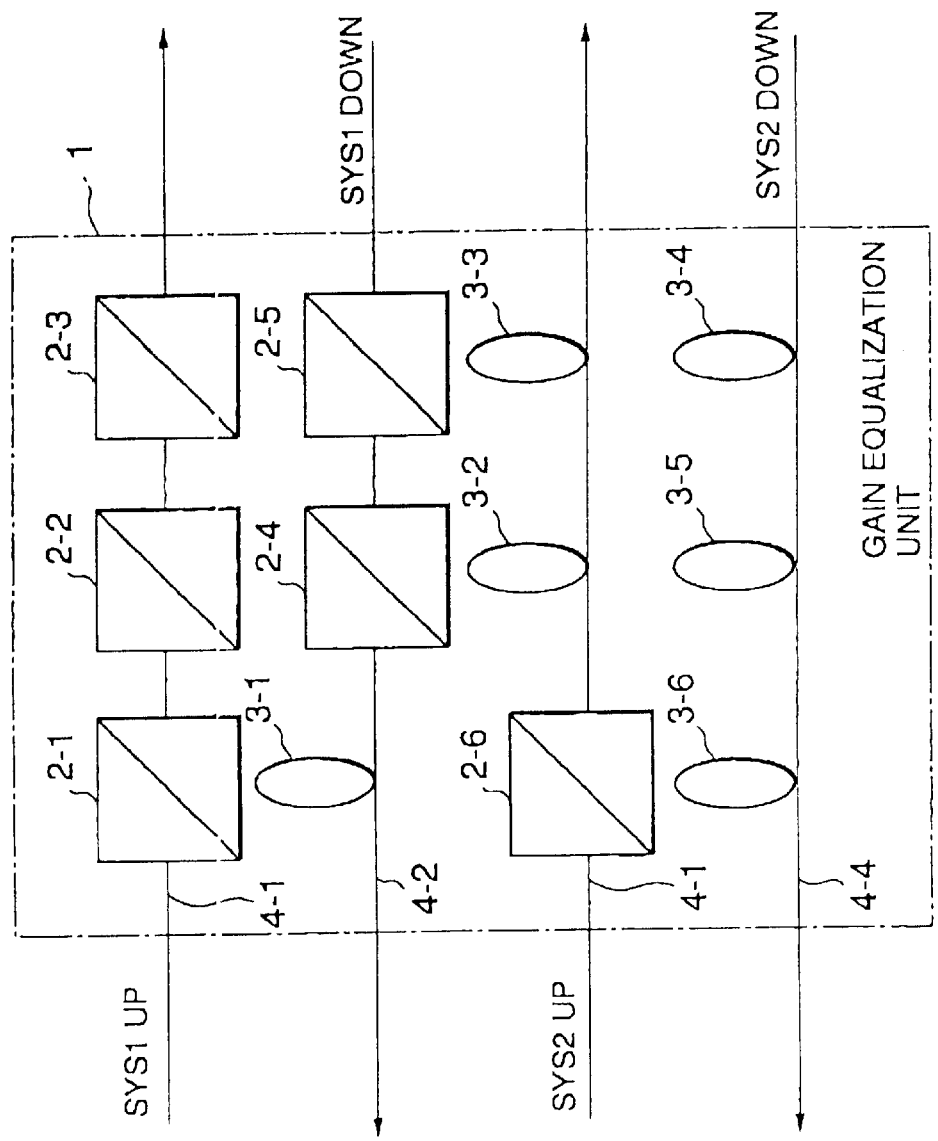
FIG. 1 is a block diagram showing an example of the configuration of a gain equalization unit according to the present invention.

FIG. 1 shows an example of a gain equalization unit 1 installed on an optical fiber transmission line consisting of four lines. An optical fiber transmission line 4-1 is an up line of system 1 (SYS1 UP). Multiplexed optical signals sent to the optical fiber transmission line 4-1, with gains varying with the channel, have their gains equalized by three gain equalizers 2-1 to 2-3. An optical fiber transmission line 4-2 is a down line of system 1 (SYS1 DOWN). The differences in gain among the channels of the optical signals sent to the optical fiber transmission line 4-2 are smaller than those of the optical signals sent to the optical fiber transmission line 4-1. Therefore, two gain equalizers, 2-4 and 2-5, are used to equalize the gains among the channels. However, the optical fiber transmission line 4-2, with a smaller number of gain equalizers than on the optical fiber transmission line 4-1, has a smaller loss. To equalize the loss of the optical fiber transmission line 4-2 with that of the optical fiber transmission line 4-1, a loss material 3-1 is used on the optical fiber transmission line 4-2. An optical fiber transmission line 4-3 is an up line of system 2 (SYS2 UP). The differences in gain among the channels of the optical signals sent to the optical fiber transmission line 4-3 are small; therefore, one gain equalizer, 2-6, is used to equalize the gains of the channels. However, the optical fiber transmission line 4-3 has a loss smaller than that of the optical fiber transmission line 4-1. To equalize the loss of the optical fiber transmission line 4-3 with that of the optical fiber transmission line 4-1, two loss materials, 3-2 and 3-3, are used on the optical fiber transmission line 4-3. An optical fiber transmission line 4-4 is a down line of system 2 (SYS2 DOWN). The differences in gain among the channels of the optical signals sent to the optical fiber transmission line 4-4 are smaller than those of the optical signals sent to the optical fiber transmission line 4-3. Therefore, the gains of the channels need not be equalized. However, the optical fiber transmission line 4-4 has a loss smaller than that of the optical fiber transmission line 4-1. To equalize the loss of the optical fiber transmission line 4-4 with that of the optical fiber transmission line 4-1, three loss materials, 3-4 to 3-6, are used on the optical fiber transmission line 4-4. For the loss materials 3-1 to 3-6 described above, cobalt doped fibers are used, for example. As described above, the gain equalizers 2-1 to 2-6 equalize the gains among the channels of a line, while the loss materials 3-1 to 3-6 make the losses among lines equal.

To install gain equalization units and loss materials on an optical fiber transmission line, the following steps are required. First, the optical input spectrum and the optical output spectrum are measured for each range of an optical fiber transmission line to calculate the gain for each wavelength of multiplexed lights. The gain wavelength characteristics are determined based on the gain for each wavelength obtained through the above calculation. Then, a gain equalization unit with the gain waveform characteristics opposite to the calculated characteristics is installed in the corresponding range of the optical fiber transmission lines 4-1 to 4-4. After the installation of gain equalization units on the transmission lines, the loss of the transmission line with the largest loss is measured. Then, loss materials are installed on other transmission lines to make the loss of each line equal to the largest loss. When actually installing an optical fiber transmission line, it is difficult to prepare, in advance, a gain equalization unit which precisely compensates for the gain wavelength characteristics of the transmission line. Therefore, several gain equalization units, each with specific gain wavelength characteristics, are manufactured. And, when installing an optical fiber transmission line, the output characteristics of the optical amplifiers are determined according to the characteristics of gain equalization units.

The following describes how the gain equalization unit operates. All multiplexed light channels have a unique power before being amplified by the erbium doped fiber amplifier (FIG. 2). However, once amplified, the multiplexed lights differ in power with the channel because of the gain wavelength characteristics of the erbium doped fiber amplifier. In particular, as multiplexed lights are transmitted via many amplifiers, the differences in power are accumulated (FIG. 3). As indicated by the dashed line in FIG. 4, the gain equalization unit compensates for the differences caused by the wavelength gain characteristics (indicated by the solid line in FIG. 4) of a plurality of erbium doped fiber amplifiers. The gain equalization unit thus flattens the gains of the optical signal transmission wavelengths (FIG. 5), equalizing the gains and powers of light signal channels (FIG. 6).

Figure 7:
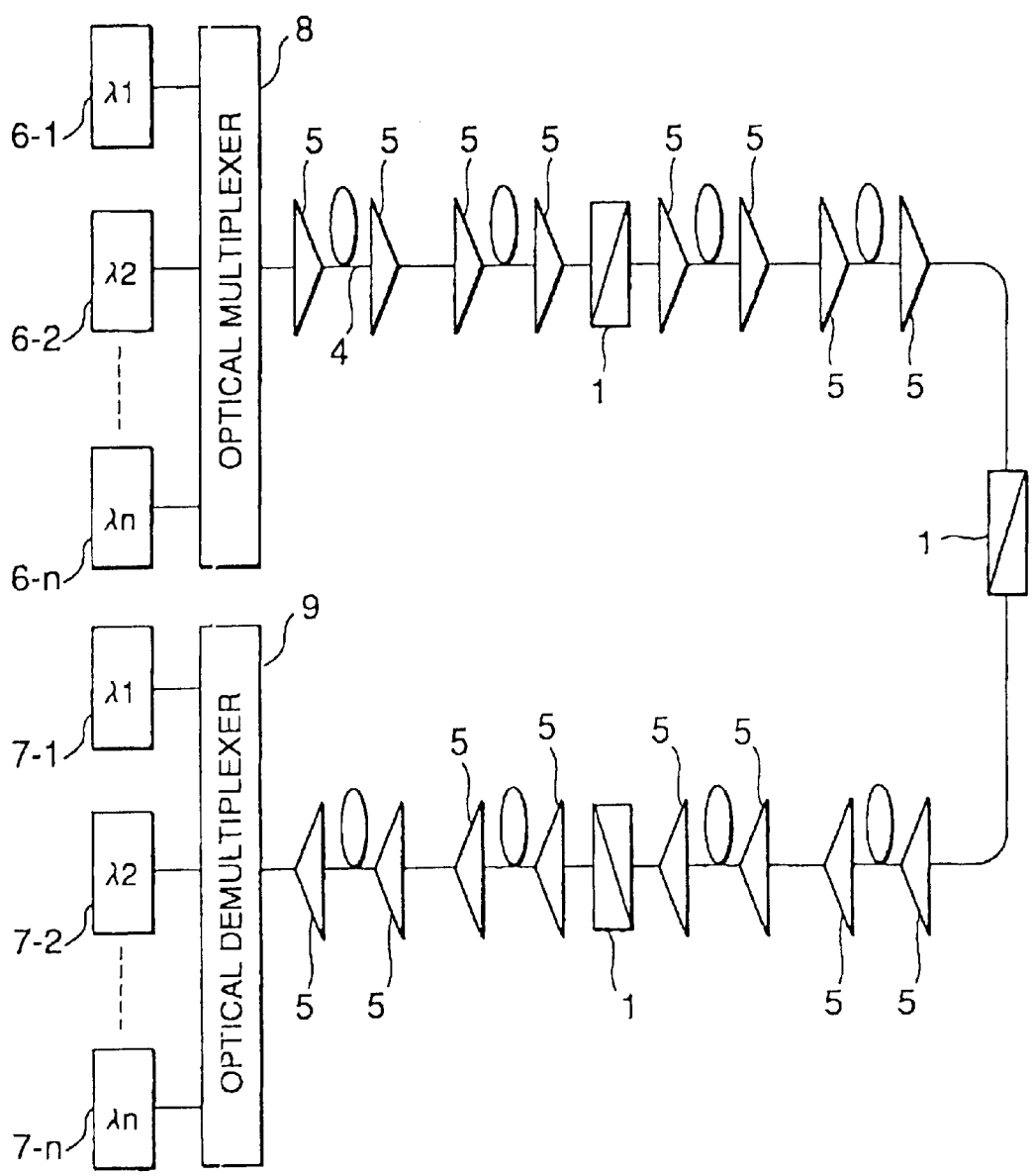
FIG. 7 is a diagram showing an optical wavelength multiplexing transmission system.

FIG. 7 is a block diagram showing an example of an optical wavelength multiplexing transmission system. An optical multiplexer 8 multiplexes light signals sent from light signal sources 6-1 to 6-n, each corresponding to a channel, and outputs them to an optical fiber transmission line 4. On the optical fiber transmission line 4, each erbium dope fiber amplifier 5 amplifies the light signals which are attenuated during transmission. Because the magnitude of amplification depends on the wavelength, the multiplexed lights differ in gain with the channel after being transmitted over the line via a plurality of erbium doped fiber amplifiers. One gain equalization unit 1 is installed in a range in which a predetermined number of erbium dope fiber amplifiers 5 are installed. The gain equalization unit 1, designed to equalize the gains of channels, have an appropriate number of gain equalizers (not shown in the figure) for each line. In the system described above, the multiplexed lights are amplified by erbium doped fiber amplifiers and, at the same time, equalized by the gain equalization units 1. After that, the lights are demultiplexed by an optical demultiplexer 9 into channels and are sent to optical receivers 7-1 to 7-n.

Figure 8A:
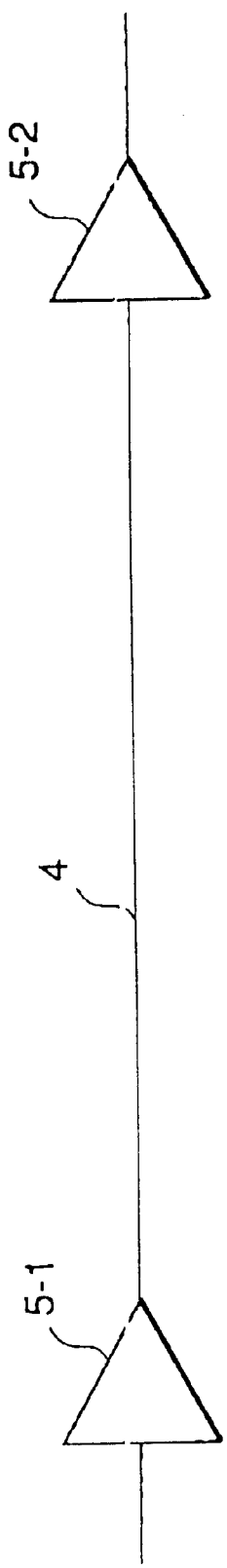
FIG. 8A is a diagram showing a range of an optical fiber transmission line.
Figure 8B:
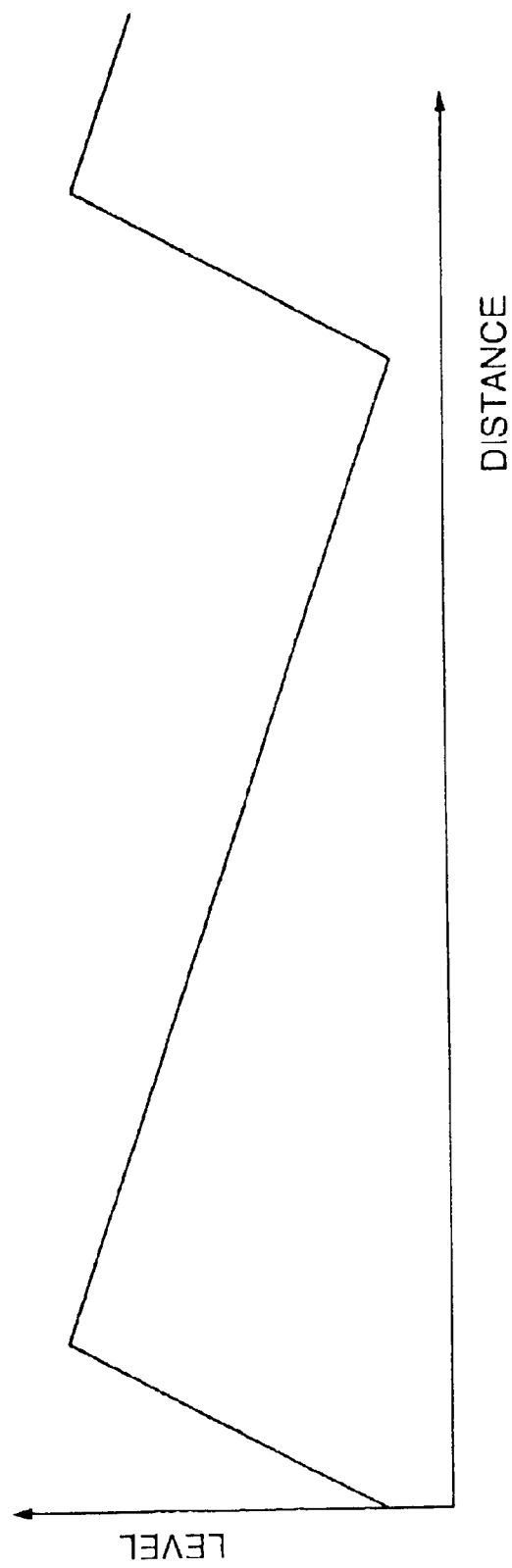
FIG. 8B is diagram showing the level diagram of the optical signal in the range shown in FIG. 8A.
Figure 9A:
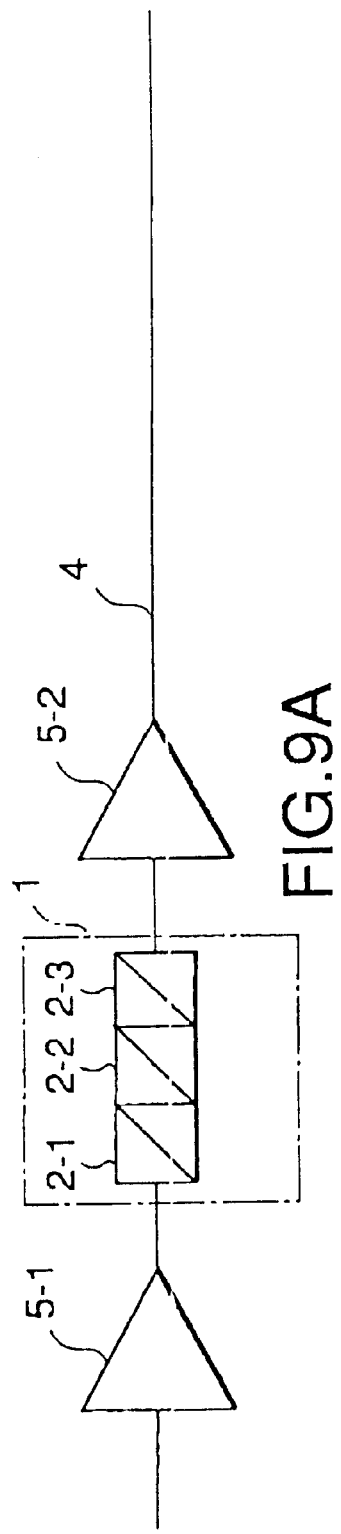
FIG. 9A is a diagram showing a range of an optical fiber transmission line on which three gain equalizers are installed.
Figure 9B:
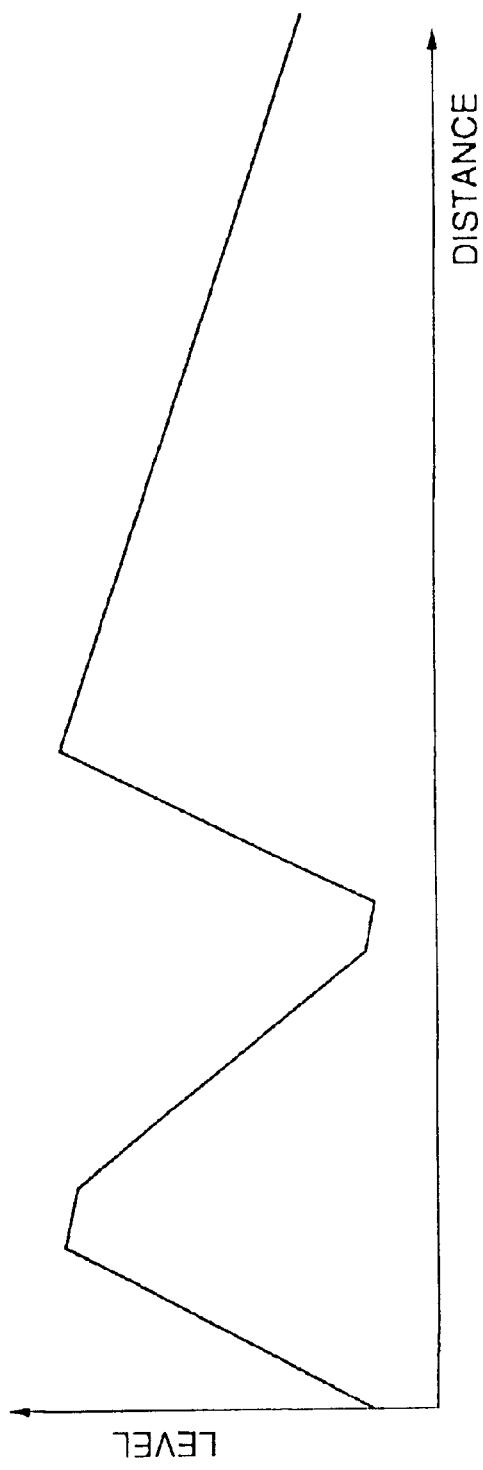
FIG. 9B is a diagram showing the level diagram of the optical signal in the range shown in FIG. 9A.

In a range of the optical wavelength multiplexing transmission system described above where only the erbium doped fiber amplifiers 5 are installed on the optical fiber transmission line 4, the optical signals are amplified by each erbium doped fiber amplifier 5 and output to the optical fiber transmission line 4. The optical signal are attenuated while they are transmitted over the optical fiber transmission line 4 and then amplified by the erbium doped fiber amplifier 5 again. This process makes the system power level constant (FIGS. 8A and 8B). On the other hand, in a range of the optical wavelength multiplexing transmission system described above where not only the erbium doped fiber amplifiers 5 but also the gain equalization unit 1 is installed on the optical fiber transmission line 4, the light signals are amplified by the erbium doped fiber amplifiers 5 and then sent to the gain equalization unit 1. The light signal have their gains equalized as they pass through the gain equalizers 2-1 to 2-3. However, it should be noted that the gain equalizers 2-1 to 2-3 give the light signals a loss much larger than that of the optical fiber transmission line 4. This means that, when the gain equalization unit 1 is installed between an erbium doped fiber amplifier 5-1 and the next erbium doped fiber amplifier 5-2, it is required that the interval between the two amplifiers be shorter than that between the two gain equalizers in a range where no gain equalization unit 1 is installed. This configuration makes the level diagram constant (FIGS. 9A and 9B).

Figure 10A:
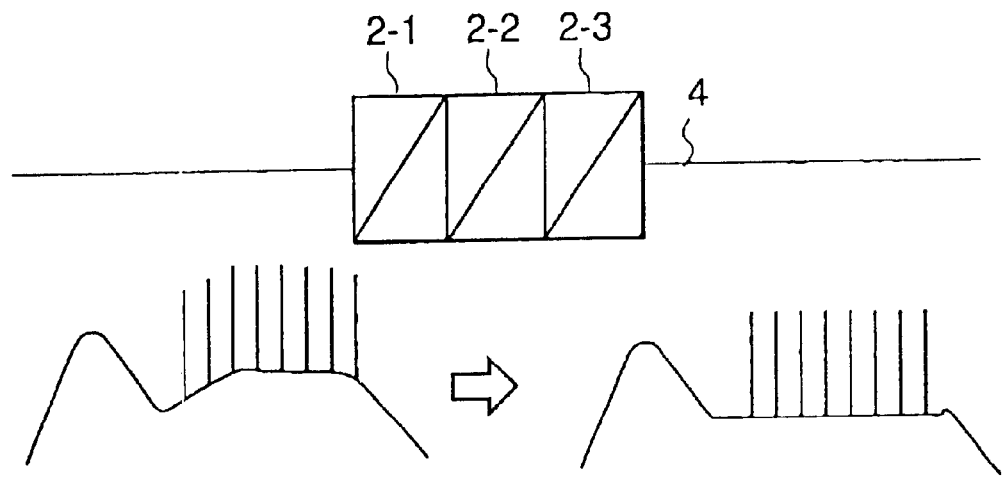
FIGS. 10A and 10B are diagrams showing the gain equalization of optical wavelength multiplexing by three gain equalizers and by two gain equalizers, respectively.
Figure 10B:
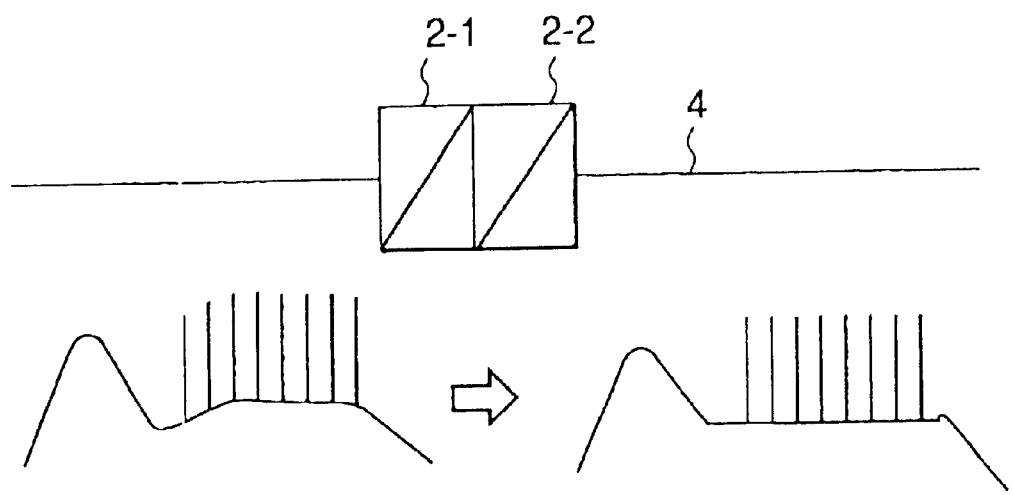
Figure 11A:
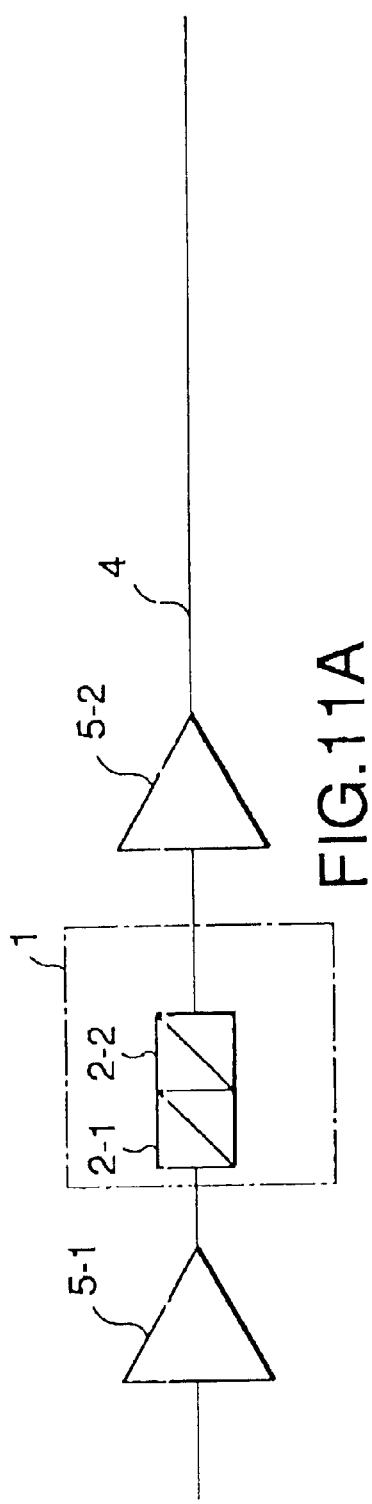
FIG. 11A is a diagram showing a range of an optical fiber transmission line on which two gain equalizers are installed.
Figure 11B:
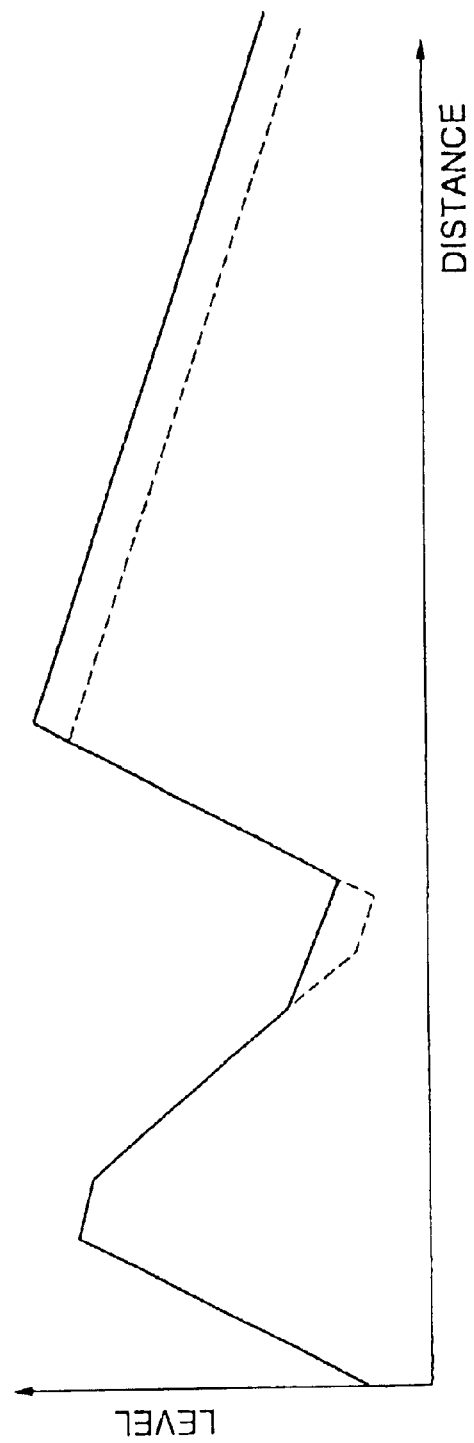
FIG. 11B is a diagram showing the level diagram of the light signal in the range indicated in FIG. 11A.
Figure 12A:
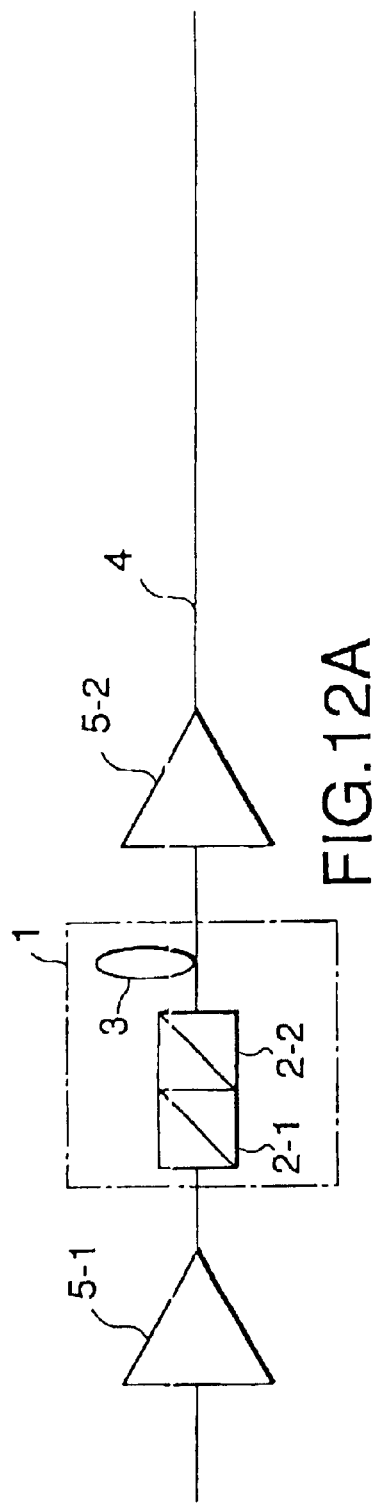
FIG. 12A is a diagram showing a range of an optical fiber transmission line on which two gain equalizers and a loss generator are installed.
Figure 12B:
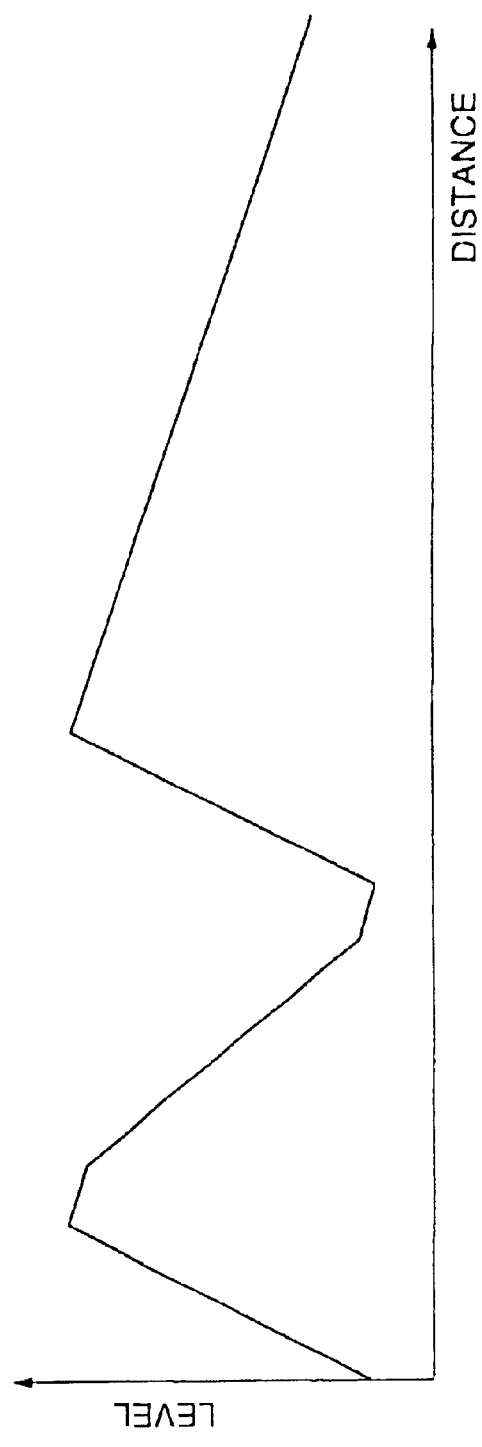

In addition, as shown in FIGS. 10A and 10B, the differences in the gain of the signal channels passing through a predetermined range of the optical fiber transmission line determine how many gain equalizers are required. For example, even when a range of the transmission line is designed to provide three gain equalizers to compensate for the differences in gain (FIG. 10A), gain equalization may be accomplished by two gain equalizers if the differences in gain among channels are smaller than expected (FIG. 10B). On the contrary, in a range of the optical fiber transmission line where three gain equalizers are required but only two gain equalizers are provided (FIG. 11A), there is a problem. In FIG. 11B, the solid line indicates the level diagram when two gain equalizers 2-1 and 2-2 are provided, and the dashed line indicates the level diagram when three gain equalizers 2-1 to 2-3 are provided. If the interval between the erbium doped fiber amplifier 5-1 and the erbium doped fiber amplifier 5-2 equals the interval shown in FIG. 9A, the gain equalizers give a smaller loss. Therefore, the power of the light signal amplified by the erbium doped fiber amplifier 5-2 increases, making the level diagram higher than the pre-set level diagram. This does not ensure the proportional relation between the input signal magnitude and the output signal magnitude and, therefore, does not give stable light signals. FIGS. 12A and 12B show the configuration, composed of the erbium doped fiber amplifiers and the gain equalization unit, which solve this problem. The gain equalization unit 1 shown in FIG. 12 contains two gain equalizers, 2-1 and 2-2, and one cobalt doped fiber 3 with a loss equivalent to that of one gain equalizer. Therefore, the configuration shown in FIG. 12A gives the same loss as that of the gain equalization unit 1 with three gain equalizers, making the level constant. The cobalt doped fiber 3 may be a cobalt dope fiber, an optical fixed attenuator, or an optical variable attenuator. The gain equalization unit has a known configuration composed of a plurality of fabry-perrot etalon filters arranged in series.

The gain equalization unit with the above configuration makes gain equalization in all lines equal and keeps the level diagram of each line constant.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical gain equalization unit installed at a predetermined interval on an optical fiber transmission line having a plurality of lines, comprising:

a plurality of gain equalizers installed on at least one line; and loss generators installed on at least one line to make the loss of each line equal to the loss of one of said plurality of lines with the largest loss.

2. The optical gain equalization unit according to claim 1, wherein said gain equalizers equalize powers of channels of each line.

3. The optical gain equalization unit according to claim 1, wherein said gain equalizers are installed to equalize gains of channels of each line.

4. The optical gain equalization unit according to claim 1, wherein said loss generators are installed to make loss amounts equal among said plurality of lines.

5. A gain equalization method of equalizing multiplexed lights transmitting through an optical fiber transmission line having a plurality of lines and a plurality of gain equalizers installed on at least one of said plurality of lines, comprising the steps of:

equalizing gains of each of ranges provided at a predetermined interval on at least one line of said optical fiber transmission line; and making loss of each of ranges provided at a predetermined interval on a least one line constant wherein the loss of each line is made equal to the loss of one of said plurality of lines with the largest loss.

6. The gain equalization method according to claim 5 wherein powers of channels of said line are equalized.

7. The gain equalization method according to claim 5 wherein the gains of channels of each line are equalized.

8. The gain equalization method according to claim 5 wherein a loss amount is constant among said plurality of lines.

9. An optical fiber transmission line having a plurality of lines, wherein a plurality of gain equalizers are installed at a predetermined interval on at least one line and loss generators are installed a predetermined interval on at least one line to make the loss of each line equal to the loss of one of said plurality of lines with the largest loss.

10. The optical fiber transmission line according to claim 9 wherein said gain equalizers equalize powers of channels of each line.

11. The optical fiber transmission line according to claim 9 wherein said gain equalizers equalize gains of channels of each line.

12. The optical fiber transmission line according to claim 9 wherein said loss generators are installed to make loss amounts equal among said plurality of lines.

* * * * *